July 3, 1956
H. HUEMER
2,753,346
PRODUCTION OF CYANURIC CHLORIDE
Filed June 21, 1951
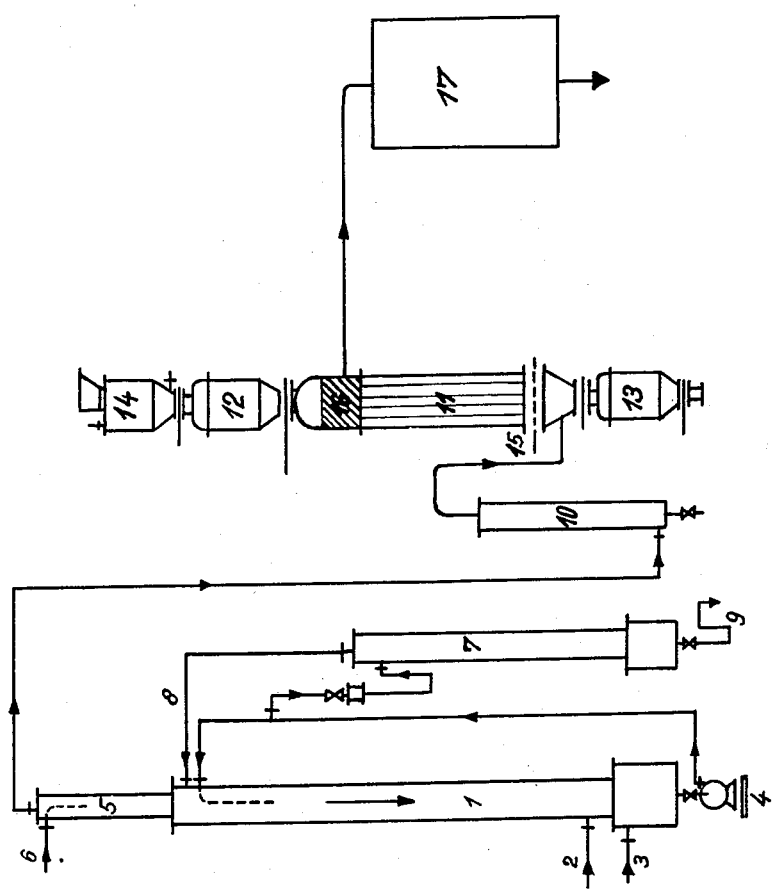
INVENTOR
Hans Huemer
By Bailey, Stephens & Huettig
ATTORNEYS

United States Patent Office 2,753,346
Patented July 3, 1956

2,753,346

PRODUCTION OF CYANURIC CHLORIDE

Hans Huemer, Frankfurt am Main, Germany, assignor to Deutsche Gold- und Silber-Scheideanstalt vormals Roessler, Frankfurt am Main, Germany, a corporation of Germany Application June 21, 1951, Serial No. 232,711

Claims priority, application Germany December 12, 1949

4 Claims. (Cl. 260—248)

The present invention relates to a process for the production of cyanuric from chlorine and hydrocyanic acid.

Cyanuric chloride (CNCl)$_3$ has not been produced on a large commercial scale, as no process has previously been developed which made such production practical. The older processes for the production of cyanuric chloride are based on the liquid phase polymerization of cyanogen chloride in solvents. However, no large scale technical process could be developed from this process; because, in view of the number of by-products produced, a complicated and tedious purification was required and the yield based on cyanogen chloride averaged only 50% to 60% of theoretical. It has also been proposed to carry out the polymerization in the gas phase by passing cyanogen chloride over wood charcoal at a temperature above the sublimation point of cyanuric chloride. While according to the literature this process produces a 40% to 50% conversion, it was found that such conversion could not be achieved, as with ordinary wood charcoal only about 10% of the cyanogen chloride introduced is converted to cyanuric chloride. It is therefore understandable that this gas phase process has not achieved commercial success, as it is necessary to recycle the major portion of the cyanogen chloride and thus, aside from the fact that the apparatus units must be disproportionately large, causes a technical difficulty in handling the cyanogen chloride because of its poisonous nature. Furthermore, the partial conversion unfavorably influences the yield obtained.

The cyanogen chloride employed was in most instances prepared from chlorine and hydrocyanic acid; for example by reacting chlorine countercurrently with a 5% to 10% solution of hydrocyanic acid as described in United States Patent No. 1,588,737. This process, however, leads to a product contaminated with hydrochloric acid, hydrocyanic acid and chlorine. To purify the product it was necessary to wash it with an aqueous calcium carbonate suspension and then to treat it with activated carbon whilst cooling. The starting material for the known cyanuric chloride synthesis was therefore cyanogen chloride, which required complicated preparation and purification before the polymerization to cyanuric chloride.

It has now been found in accordance with the invention that cyanuric chloride can be continuously produced in a suitable apparatus unit directly from chlorine and hydrocyanic acid without the isolation of any intermediate products with yields of 92% to 95% of the theoretical, whereby furthermore the cyanuric chloride is produced with a 99.5% to 100% purity so that it is suitable for direct use in other reactions. A further advantage of the process in accordance with the invention is that the cyanuric chloride is obtained in an extremely fine crystalline form, which renders it more easily dissolved in organic solvents and more easily dispersible in aqueous mediums.

In the process in accordance with the invention, chlorine is caused to react with a recycled hydrocyanic acid solution, and the cyanogen chloride produced preferably after washing with water and drying with a non-alkaline drying medium such as calcium chloride or silica gel is passed over active carbon at a temperature above 200° C., preferably 350° C. to 400° C. Excellent results were obtained with a relatively dilute recycled hydrocyanic solution in which a substantially constant concentration of about 2% to 3% was maintained.

The active carbon employed in accordance with the invention is a highly active gas absorption carbon such as can be obtained by gas activation of carbonized organic material; such as wood, peat, lignite, nut shells, fruit kernel shells and the like, by heating it with steam, carbon monoxide or carbon dioxide at high temperatures of about 800° C. to 1000° C. or by impregnating organic materials with activating chemicals; such as zinc chloride, phosphoric acid, potassium sulfide, potassium sulfate, potash or other potassium salts, and subjecting the treated organic materials to destructive distillation; for example, by heating to temperatures of about 600° C. to 800° C. and washing and drying the resulting carbonized product. The gas-activated carbon products have been found preferable for the process in accordance with the invention.

It has also been found that alkalized active carbons are especially well suited for the process in accordance with the invention. For example, excellent results were obtained with an active carbon produced by treating charcoal with wood tar and a caustic potash solution, subjecting it to a low temperature carbonization and treating the resulting product with steam at 800° C. to 1000° C. It was also found that it is preferable to subject the active carbon, employed as a polymerization catalyst in accordance with the invention, to a sharp drying treatment; as with a moisture content above 1%, the catalyst life is only several hours; whereas if the moisture content is reduced below 1%, preferably to 0.5% and below, its life is increased fiftyfold.

It was also found that the life of the active carbon catalyst also depends on the material from which the contact chamber is constructed. While the process in accordance with the invention can be carried out with contact chambers, the walls of which are of ordinary steel, without affecting the purity of the cyanuric chloride produced for a considerable period of time, it is advantageous to employ alloy steels which are corrosion-resistant; such as, those which contain chromium and nickel or molybdenum, as the activity of the active carbon can be maintained for a longer period of time. Comparative tests have shown that when the active carbon catalyst is supported in iron tubes the conversion achieved, which is initially quantitative, noticeably decreases after about five hours whereas when the catalyst is supported in V2A alloy steel tubes the rate of conversion is substantially not diminished even after 50 to 100 hours. Instead of corrosion-resistant alloy steels, nickel can be employed for the catalyst vessel with equally good results.

While the measures mentioned increase the life of the catalyst to such an extent that complete renewal of the catalyst is only required after long periods of use, it has been found expedient to arrange the catalyst chamber so that fresh catalyst can be supplied, and spent catalyst withdrawn without interruption of the polymerization reaction. It was surprisingly found that the spent active carbon catalyst still retains its flow characteristics, and consequently simple mechanical means can be provided to pass the active carbon catalyst through the chambers either continuously or periodically at a rate to compensate for the amount of catalyst which is exhausted.

The catalytic polymerization of cyanogen chloride employing active carbon as a catalyst is substantially quantitative and only requires a single pass through the catalyst and consequently avoids the recycling which is necessary with ordinary charcoal catalysts.

The accompanying drawings diagrammatically show an apparatus suitable for carrying out the continuous process in accordance with the invention.

The following example describes a preferred mode of carrying out the process in accordance with the invention with reference to the drawings:

*Example*

6.75 kilograms per hour of hydrocyanic acid were introduced through inlet 2 into the base of the filled reaction column or tower 1 and at a short distance below 17.75 kilograms per hour of chlorine were introduced through inlet 3. With the aid of a centrifugal pump 4, 2 to 4 cubic meters per hour of a 2 to 3% aqueous solution of hydrocyanic acid were recycled from the base to the top of the column 1. Through inlet 6, about 300 liters of wash water were supplied to the top of the smaller filled wash column 5 arranged above the reaction column so that the wash water trickled down into the top of reaction column 1. Column 1 was provided with heat exchange units to carry off the heat of reaction and to maintain the temperature of the reactants within the column constant at about 40° C. As the system was operated continuously, a portion of the recycled dilute hydrocyanic acid corresponding to the quantity of wash water introduced into the cycle was branched out of the cycle and introduced into column 7 in which the volatile hydrocyanic acid and cyanogen chloride in such portion were separated. The resulting dilute HCl was removed through outlet 9 and the volatilized hydrocyanic acid and cyanogen chloride were reintroduced into the cycle at the top of column 1 through conduit 8. The gas leaving wash column 5 was passed through a drying tower 10 containing calcium chloride and then introduced into a catalyst chamber 11 composed of V2A steel. The contact chamber 11 was connected with bunkers 12 and 13, respectively, serving to supply fresh activated carbon catalyst to, and to receive the spent catalyst from, chamber 11. Above bunker 12 a small electrically heated shaft furnace 14 was provided in which the fresh active carbon catalyst was heated to 800° C. to 1000° C. under nitrogen to reduce the water content of the active carbon to below 1%. At the lower end of the contact chamber a discharge mechanism 15 for discharging the spent catalyst to bunker 13 was provided. The active carbon employed was a gas-activated charcoal obtained by heating charcoal under steam to temperatures above 900° C. The contact chamber 11 was surrounded with a heating fluid, for instance, a mixture of diphenyl and diphenyl oxide in order to maintain the reaction temperature in the chamber within a range of 350° to 500° C. The cyanogen chloride was supplied at the lower end of the contact chamber 11, passed through said chamber and converted into cyanuric chloride. The cyanuric chloride vapors were passed through an active carbon filter bunker 16 provided at the top of the reaction chamber 11 thereby removing all impurities which are perhaps formed in contact with the walls of the reaction chamber 11. The purified cyanuric chloride vapors are then collected in the cooled collector 17 and converted into a solid form. The cyanuric chloride is collected as a clean white loose powder having a melting point of 145° C. to 146° C. which is free of metallic and other impurities. The yield of the pure product was 14.5 kilograms per hour which was 94.3% of the theoretical.

This application is a continuation-in-part of my application Serial No. 156,301 filed April 17, 1950.

I claim:

1. A process for the production of cyanuric chloride which comprises passing dry cyanogen chloride over a gas activated active carbon catalyst maintained at a temperature over 200° C., said active carbon having been predried to provide a moisture content below 1% in such catalyst.

2. A process for the production of cyanuric chloride which comprises passing dry cyanogen chloride over a steam activated active carbon catalyst maintained at a temperature over 200° C., said active carbon having been predried to provide a moisture content below 1% in such catalyst.

3. A process for the production of cyanuric chloride which comprises passing dry cyanogen chloride over a gas activated active carbon catalyst maintained at a temperature over 200° C., said active carbon having been predried to provide a moisture content below 1% in such catalyst and said gas activation being carried out at temperatures between 800 and 1000° C.

4. A process for the production of cyanuric chloride which comprises passing dry cyanogen chloride over a steam activated active carbon catalyst maintained at a temperature over 200° C. said active carbon having been predried to provide a moisture content below 1% in such catalyst and said steam activation being carried out at temperatures between 800 and 1000° C.

References Cited in the file of this patent

UNITED STATES PATENTS

| | | |
|---|---|---|
| 1,743,975 | Mik | Jan. 14, 1930 |
| 2,391,490 | Thurston | Dec. 25, 1945 |
| 2,491,459 | Thurston | Dec. 13, 1949 |